M. R. BRADY.
SHOCKING MACHINE.
APPLICATION FILED MAR. 23, 1918.

1,324,031.

Patented Dec. 9, 1919.
2 SHEETS—SHEET 1.

Inventor
Marquis R. Brady
By Louis E. Vanderlip
Attorney

M. R. BRADY.
SHOCKING MACHINE.
APPLICATION FILED MAR. 23, 1918.
1,324,031.
Patented Dec. 9, 1919.
2 SHEETS—SHEET 2.
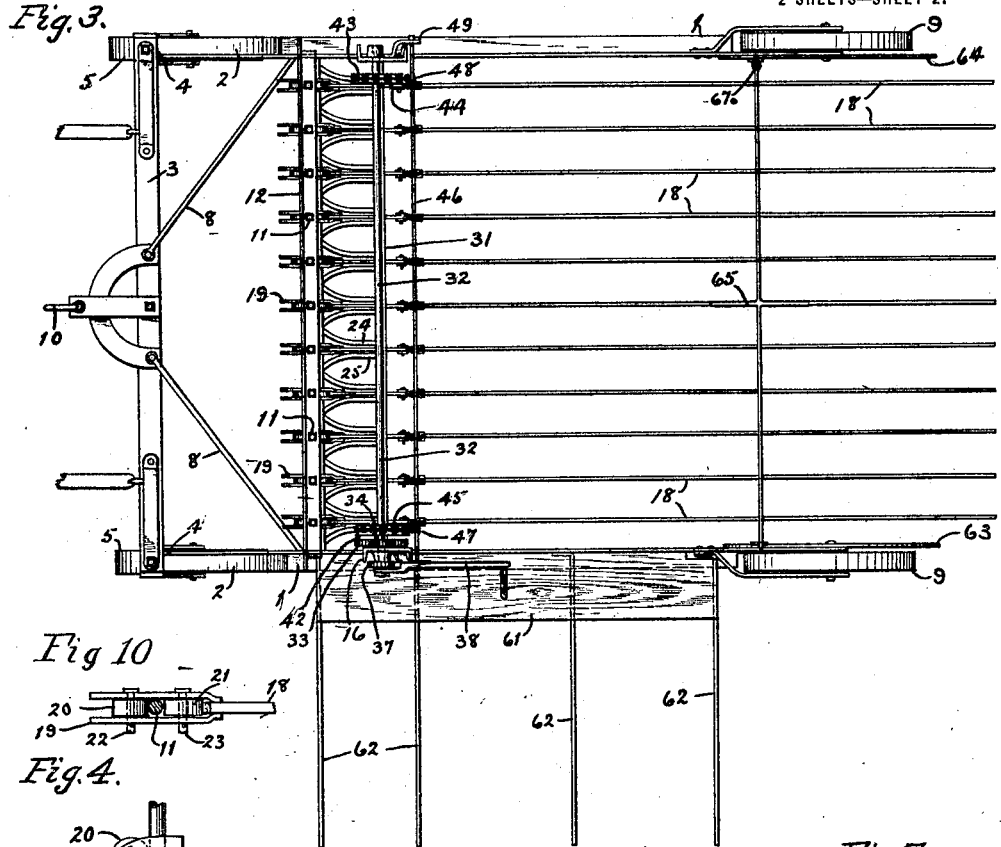
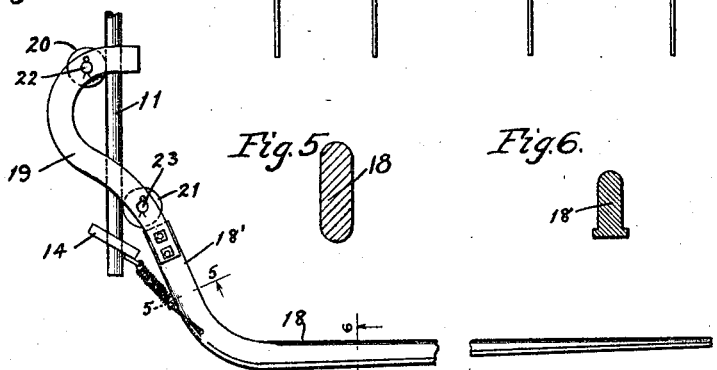
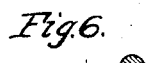
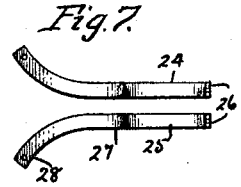
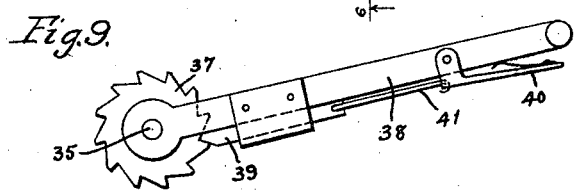
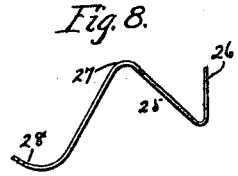
Inventor
Marquis R. Brady
By Louis C. Vanderlip.
Attorney

UNITED STATES PATENT OFFICE.

MARQUIS R. BRADY, OF SYRACUSE, INDIANA.

SHOCKING-MACHINE.

1,324,031. Specification of Letters Patent. Patented Dec. 9, 1919.

Application filed March 23, 1918. Serial No. 224,383.

*To all whom it may concern:*

Be it known that I, MARQUIS R. BRADY, a citizen of the United States, residing in the town of Syracuse, county of Kosciusko, State of Indiana, have invented certain new and useful Improvements in Shocking-Machines, of which the following is a specification.

My invention relates to grain shocking machines of the class designed to be moved through a grain field and upon which the grain shock is to be built or formed and subsequently deposited upon the ground as a shock unit.

One of the objects of my invention is the production of a shocking machine having an improved platform construction, one in which the platform bars are independently upwardly movable when lowered to the ground for effecting efficiency against stones, obstructions, &c. Another object is the production of a platform bar having a roller bearing mount. Another object is the production of improved platform bar guides. Other objects of my invention are mentioned and described herein.

Figure 1:
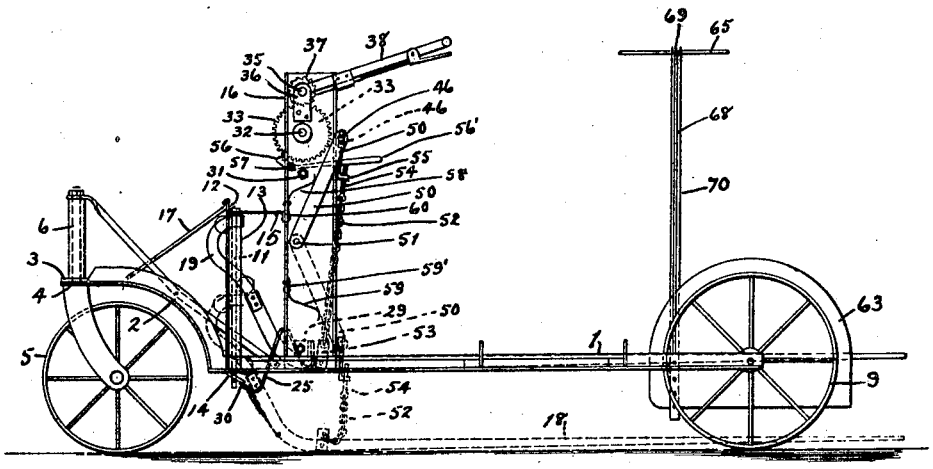
Figure 2:
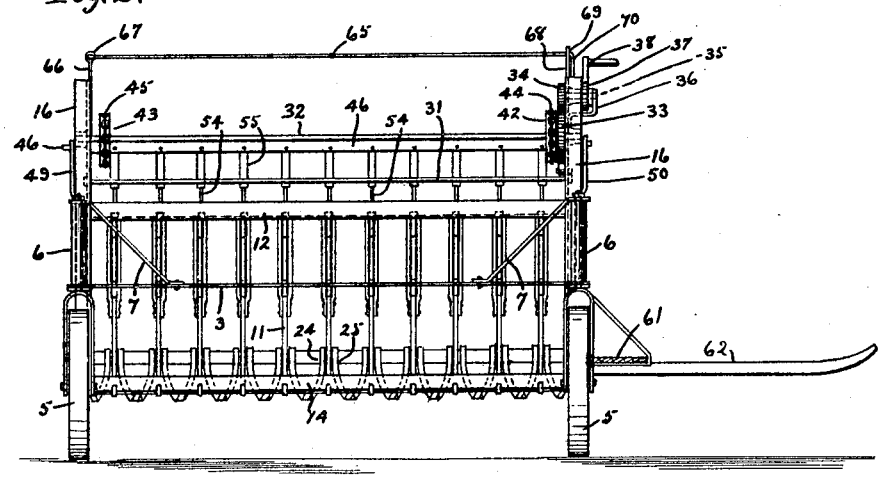

The preferred embodiment of my invention is well illustrated in the accompanying drawings in which Figure 1 is a side elevation of the machine; Fig. 2 is a front elevation; Fig. 3 is a plan view of the machine; Fig. 4 is a detail of the platform bar roller bearing and the bar; Fig. 5 is a section taken on the line 5—5 of Fig. 4; Fig. 6 is a section taken on the line 6—6 of Fig. 4; Fig. 7 is a top plan view of a pair of platform bar guides; Fig. 8 is a side elevation of one of the guide bars shown in Fig. 7; Fig. 9 is a view of the platform elevating and control lever; Fig. 10 is a fragment showing a top plan view of the platform bar roller bearing. Similar numerals of reference indicate like members and parts of members throughout the several views on the drawings.

Referring to the drawings in detail, the numerals 1, 1 indicate a pair of spaced horizontal angle iron frame side members, each member having a yoke 2 at its forward end said yoke being rigidly fastened to the front frame cross member 3 at 4, 4, respectively. Numerals 5, 5 indicate a pair of front caster wheels mounted in the bearings 6, 6 which are provided with suitable lateral braces 7, 7 fastened to the cross frame member 3. Numerals 8, 8 indicate a pair of frame braces connecting the front cross member 3 with each side frame member 1. Numerals 9, 9, indicate a pair of rear carrier wheels suitably mounted upon stub axles carried adjacent the rear end of each side frame member 1. Numeral 10 indicates a hook or clevis adapted to be engaged by a traction chain or the like for hauling the machine. Numerals 11, 11 indicate a plurality of substantially upright stanchions, or platform bar carriers, mounted in the transverse bar members 12 and 14, respectively, the opposite ends of the bar 12 being carried upon the oppositely disposed upright members 13, 13 fastened to the side frame members 1, 1. Numeral 15 indicates a pair of brace members connecting the upper end of the members 13 with the oppositely disposed upright channel members 16, 16, the latter being fastened rigidly at their bases to the frame side members 1, 1.

Numerals 18, 18 indicate a plurality of spaced substantially parallel platform bars mounted on roller bearings at the front ends thereof and adapted to be raised and lowered as hereinafter described. The numeral 19 indicates a roller bearing frame rigidly fastened to the upwardly bent portion 18' of each bar 18 and in which are mounted two rollers 20 and 21 which are revolubly mounted upon the roller pins 22 and 23, respectively, said rollers being arranged at the front and rear of the carrier 11 and in engagement therewith, whereby each bar 18 is maintained in a substantially horizontal position at all times when elevated and while being lowered.

Numerals 24 and 25 indicate two members of a series of pairs of platform bar guides, each pair comprising one each of the bars 24 and 25, there being a pair for each platform bar 18. Each of the bar guides comprises an upwardly bent portion 26, a medial elevated portion 27, and a depressed forward end spreading portion 28. The numeral 29 indicates a transverse bar member secured at opposite ends thereof to the side frame members 1, 1 and extending between the bases of the channel members 16, the portion 26 of each of the guide bars 24 and 25 being fastened thereto, the forward end 28 of said bar being rigidly fastened to a transverse bar 30 which is mounted upon the under side of the lower stanchion bar 14. Numeral 31 indicates a transverse rod rigidly connecting the upright channels 16, 16.

Numeral 32 indicates a transverse shaft member having its opposite ends suitably journaled in bearings mounted in the upright channels 16, 16, a driving gear 33 being rigidly mounted upon and adjacent one end of said shaft and meshing with a pinion 34 which is rigidly carried by a short shaft 35 which has its outer end journaled in a bearing bracket 36. Numeral 37 indicates a ratchet wheel rigidly mounted upon the shaft 35 adjacent the bearing bracket 36 and adapted to be operated by the hand lever 38 which is pivoted on the outer end of the shaft 35, the lever 38 carrying a retractile ratchet pawl 39 operatively connected with the pawl operating lever 40 by a link 41, whereby a disengageable connection may be made between the lever 38 and said ratchet.

Numerals 42 and 43 indicate a plurality of chain wheels mounted upon and adjacent the opposite ends of the shaft 32 and having the chains 44 and 45, respectively, connected therewith for winding purposes, the other end of said chains being operatively connected with a transverse bar member 46 at 47 and 48, respectively, said bar having its opposite ends pivotally mounted in the elevating levers 49 and 50 which are pivoted at 51, 51 in said channel members and adapted to swing in a vertical plane. Numerals 52, 52 indicate a plurality of platform bar chains, one for each of said platform bars, the lower end whereof is connected at 53 with a bar 18, the upper end of each chain carrying an adjusting screw 54 mounted in the carrier member 55 which is rigidly connected with the bar 46, the chain connection at 53 with the bar 18 being effected ahead of the center of gravity of the bar.

Numeral 56 indicates a pawl member pivoted in the channel member at 57 and below the gear 33 and adapted to engage in the teeth of the gear 33 to prevent rotation of the shaft 32 when the platform bars 18 have been wholly elevated or partially so, said pawl having a handle 56' for the manual operation thereof. Numerals 58 and 59 indicate upper and lower buffer springs fastened to the channel 16, at 60 and 59' respectively, and adapted to be engaged by the lever 50 when in an extreme position of elevation or depression.

Numeral 61 indicates a step or running board on one side of the machine adjacent which a plurality of laterally extending sheave brackets 62, 62 project upon which the sheaves may be temporarily placed. Numerals 63 and 64 indicate shields for the rear wheels 9, 9 which are suitably secured to the side frame members 1. The numeral 65 indicates a cross member supported above the bars 18 and around which the shock may be built, one end of the cross being pivotally connected at 67 to the upright member 66, the other end being supported by the upright member 68 the upper end whereof is slotted at 69, said cross having a depending handle 70.

In operating the platform bars 18 it is obvious that they will drop in a horizontal position to the ground when the ratchet and pawl device is released. It is also obvious that each bar 18 is independently upwardly movable and that the whole platform is not affected, when lowered by a stone or other obstruction engaging one of the bars. It is evident also that the bars 18 are held in spaced relation and substantially parallel, when raised, by the guide bars 24 and 25, and that the bars are readily guided into said guides by the Y formation of each pair of guides, when being lifted from the ground.

In the operation of my improved grain shocking machine in a grain field it may be drawn adjacent a grain cutter and binder from which the sheaves are either delivered to an operator who may stand upon the footboard 61, or they are dumped upon the carrier brackets 62 for subsequent handling by the operator, by whom the grain shock is then manually built up upon the bars 18.

I claim:

1. In a grain shocking machine, the combination with the supporting frame, of a drop platform composed of a plurality of independently movable platform bars, each of said bars having an independent antifriction bearing at one end thereof; means for spacing the platform bars; and means for raising and lowering the platform.

2. In a grain shocking machine, the combination with the supporting frame, of a plurality of upright platform carriers; a plurality of independently movable platform bars, each of said bars having an independent two point antifriction bearing at one end thereof engaging one of said carriers and on opposite sides thereof; means for spacing said platform bars when raised; and means for raising and lowering the platform.

3. In a grain shocking machine, a frame; an upright platform bar carrier member supported by the frame; a platform bar bearing member engaging said bar carrier on opposite sides thereof and in different planes, said bearing member having an antifriction member at the points of engagement with said carrier member; a platform bar connected with said bearing member; means for raising and lowering said platform bar; and means for preventing lateral displacement of the bar when raised.

4. In a grain shocking machine, a frame;

an upright platform bar carrier member mounted upon the frame; a platform bar bearing member engaging said bar carrier on opposite sides thereof and in different planes, said bearing member having an anti-friction member at the points of engagement with said carrier member; a platform bar connected with said bearing member; means for raising and lowering said platform bar; a downwardly extending Y shaped platform bar guide member adapted to guide said platform bar during elevation thereof; and means for preventing lateral displacement of the platform bar when raised.

5. In a grain shocking machine, a frame; an upright platform bar carrier member mounted upon the frame; a platform bar bearing member engaging said bar carrier on opposite sides thereof and in different planes, said bearing member having an anti-friction member at the points of engagement with said carrier member; a platform bar connected with said bearing member; means for raising and lowering said platform bar; a downwardly extending Y shaped platform bar guide member adapted to guide said platform bar during elevation thereof, the upper end of said guide member being adapted to prevent lateral displacement of the bar when raised.

In testimony whereof I have hereunto affixed my signature this 16th day of March, 1918.

MARQUIS R. BRADY.